(12) United States Patent
Beall et al.

(10) Patent No.: US 8,048,816 B2
(45) Date of Patent: Nov. 1, 2011

(54) COLORED MACHINABLE GLASS-CERAMICS

(75) Inventors: George Halsey Beall, Big Flats, NY (US); Linda Ruth Pinckney, Corning, NY (US); Steven Alvin Tietje, Lindley, NY (US)

(73) Assignee: Corning Incorporated, Corning, NY (US)

(*) Notice: Subject to any disclaimer, the term of this patent is extended or adjusted under 35 U.S.C. 154(b) by 239 days.

(21) Appl. No.: 12/426,333

(22) Filed: Apr. 20, 2009

(65) Prior Publication Data

US 2009/0274869 A1 Nov. 5, 2009

Related U.S. Application Data

(60) Provisional application No. 61/049,614, filed on May 1, 2008.

(51) Int. Cl.
- *C03C 3/112* (2006.01)
- *C03C 3/118* (2006.01)
- *C03C 3/062* (2006.01)
- *C03C 10/16* (2006.01)

(52) U.S. Cl. .......... 501/57; 501/59; 501/3; 501/73; 501/77

(58) Field of Classification Search .......... 501/3, 57, 501/58, 59, 73, 77
See application file for complete search history.

(56) References Cited

U.S. PATENT DOCUMENTS

| | | | |
|---|---|---|---|
| 2,920,971 A | 1/1960 | Stookey et al. | |
| 3,689,293 A | 9/1972 | Beall | |
| 3,732,087 A | 5/1973 | Grossman | |
| 3,756,838 A | 9/1973 | Beall | |
| 3,839,055 A | 10/1974 | Grossman | |
| 4,118,237 A * | 10/1978 | Beall et al. | 501/3 |
| 4,467,039 A * | 8/1984 | Beall et al. | 501/3 |
| 4,608,348 A * | 8/1986 | Beall et al. | 501/3 |
| 4,991,582 A | 2/1991 | Byers et al. | |
| 5,070,044 A | 12/1991 | Pinckney | |
| 5,387,558 A * | 2/1995 | Grossman | 501/3 |
| 6,645,285 B2 | 11/2003 | Brodkin et al. | |
| 2006/0010917 A1 | 1/2006 | Fechner et al. | |
| 2006/0268528 A1 | 11/2006 | Zadesky et al. | |
| 2007/0149379 A1 | 6/2007 | Hsu et al. | |

FOREIGN PATENT DOCUMENTS

| | | | |
|---|---|---|---|
| JP | 50070413 | * | 6/1975 |
| SU | 380598 | * | 8/1973 |

OTHER PUBLICATIONS

James Dwight Dana et al; "Dana's New Mineralogy"; J Wiley & Sons; 1997; p. 1444-1447.
S.W. Bailey et al; "Reviews in Mineralogy", vol. 13; Mineralogical Society of America; p. 1-12 1984.
Wolfrom Holand et al; "Glass-Ceramic Technology" American Ceramic Society, Westerville OH; 2002 p. 229-258.
Wolfrom Holand et al; "Glass-Ceramic Technology" American Ceramic Society, Westerville OH; 2002 p. 1-12.
Wolfrom Holand et al; "Glass-Ceramic Technology" American Ceramic Society, Westerville OH; 2002 p. 236-241.

* cited by examiner

*Primary Examiner* — Karl Group
(74) *Attorney, Agent, or Firm* — Walter M. Douglas

(57) ABSTRACT

The invention relates to opaque, colored glass-ceramic articles and to the production of opaque, colored glass-ceramic articles which can be readily formed to a desired shape using standard metal-working tools. The glass-ceramic material used to make such articles contains mica crystals as the predominant phase. The desired color is obtained through the addition of a colorant system to the precursor glass. In a particular embodiment the invention is directed to a black glass-ceramic article, the black color being obtained by the addition of iron oxides in levels as high as 20 wt %, which can yield a glass-ceramic having an iron-rice mica phase and/or a glass ceramic having an iron-rich mica phase plus an iron oxide phase.

7 Claims, 3 Drawing Sheets

COLORED MACHINABLE GLASS-CERAMICS

CROSS-REFERENCE TO RELATED APPLICATIONS

This application claims the benefit of priority under 35 U.S.C. §119(e) of U.S. Provisional Application Ser. No. 61/049,614 filed on May 1, 2008.

TECHNICAL FIELD

The invention is directed to colored machinable glass-ceramics that can be used as durable housings for electronic devices. In particular the invention is directed to mica-phase-containing glass ceramics that can be used as durable housings for electronic devices.

BACKGROUND

Mica is classified as a phyllosilicate; its basic structural feature is a composite sheet in which a layer of octahedrally-coordinated cations is sandwiched between two identical layers of linked $(Si,Al)O_4$ tetrahedra. The general formula of the mica structure can be found in Dana's New Mineralogy, R. V. Gaines et al., eds. (John Wiley & Sons, New York 1997), pages 1444-1446 and the structure can be written as:

$A_{0-5}R_{2-3}T_4O_{10}X_2$ where:

A=a large monovalent or bivalent ion (e.g. $Na^+$, $K^+$, $Rb^+$, $Cs^+$, $Ca^{2+}$, $Sr^{2+}$, $Ba^{2+}$), or a partial vacancy (partial vacancy denoted by subscript "0"), R=an octahedrally-coordinated cation (e.g. $Li^+$, $Mg^{2+}$, $Fe^{2+}$, $Mn^{2+}$, $Zn^{2+}$, $Al^{3+}$, $Fe^{3+}$, $Mn^{3+}$, $V^{3+}$), T=a tetrahedrally-coordinated cation (predominantly $Si^{4+}$, with $Al^{3+}$ and $B^{3+}$), and X=is an anion (predominantly $OH^-$ in minerals, but $F^-$ in glass-ceramics. X may also be partially $O^{2-}$.)

Micas are extremely common in rocks, and numerous classification systems exist for them. In glass-ceramics, micas are typically classified as alkaline (containing alkali ions) and non-alkaline (containing no monovalent ions), and as trisilicic (where $T_4$ in the formula above is $(Si_3Al)$) and tetrasilicic $(Si_4)$. These compositional parameters can be varied to produce desired properties in a glass-ceramic.

Machinable mica glass-ceramics based on mica crystal phases were originally disclosed in the art more than thirty years ago [e.g. U.S. Pat. Nos. 3,689,296, 3,732,087, 3,839,055, and 3,756,838], and Table 1 below shows general formulas for trisilicic, tetrasilicic and non-alkali glass-ceramics having mica structures, the alkali-containing glass-ceramics being included in the trisilicic and tetrasilicic categories. These materials have found numerous uses based on their unusual capability of being machinable to high tolerance using conventional high speed metal-working tools. By suitably tailoring their compositions and nucleation and crystallization temperatures, a wide range of microstructures can be obtained, including the "house-of-cards" microstructure of relatively large mica crystals with high two-dimensional aspect ratios, which most enhances the inherent machinability of the materials (see W. Höland and G. Beall, *Glass Ceramic Technology* (Amer. Ceramic Soc., Westerville, Ohio, 2002), pages 7-9 and 236-241. Additionally, one can refer to U.S. Pat. No. 2,920,971 (Stookey), the basic patent in the field of glass-ceramics, which provides an extensive study of the practical aspects and theoretical considerations that must be understood in the manufacture of such articles as well as a discussion of the crystallization.

The machinable mica glass-ceramics typically have an inherent white color. For certain applications, however, especially for consumer-oriented products, a colored machinable glass-ceramic is desired. Of particular interest would be a black or deep charcoal grey color. The addition of colorants to opaque glass-ceramics has been disclosed in the art. Colored canasite glass-ceramics were disclosed in U.S. Pat. No. 5,070,044, but these are not machinable materials. D. G. Grossman in U.S. Pat. No. 3,732,087 discloses the addition of glass colorants, for example, transition metal oxides, rare earth oxides, and colloidal metals such as Au, to tetrasilicic mica glass-ceramics, typically in levels less than 2%. In a preferred embodiment, the colorant was added to the molten glass just prior to forming, leading to a marble-like effect in the final glass-ceramic. While the patent indicates that less than 5% colorant is preferred, claim 2 of the patent covers a total of 0-20% of glass colorants.

Durable glass-ceramic articles for use as the outer shell or body of consumer electronics, for example, cellphones, music players, notebook computers, game controllers, computer "mice", electronic book readers and other devices, are desirable and possess certain advantages such as weight and/or resistance to impact damage (e.g., denting), over the present materials such as plastic and metal. It is particularly desirable to have colored durable glass-ceramic articles for such uses.

SUMMARY

The invention relates to opaque, colored glass-ceramic articles and to the production of opaque, colored glass-ceramic articles which can be readily formed to a desired shape using standard metal-working tools. The glass-ceramic material used to make such articles contains mica crystals as the predominant crystalline phase. The desired color is obtained through the addition of a colorant system to the precursor glass. By adding the colorant to the glass precursor the color is homogeneous throughout the article's body and is not restricted to the surface of the article. The colors comprise the range from white to black, and include yellow, blue, green, gray, and such other colors as may be attainable by the addition of selected colorants to the precursor glass. In a particular embodiment the invention is directed to a black glass-ceramic article, the black color being obtained by the addition of iron oxides in levels as high as 20 wt %, which can yield a phase assemblage of an iron-rich mica phase, or a mixture of a mica phase and an iron oxide phase. The glass-ceramic article can be used in a variety of consumer electronic articles, for example, cellphones and other electronic devices capable of wireless communication, music players, notebook computers, game controllers, computer "mice", electronic book readers and other devices. The glass-ceramic articles have been found to have a "pleasant feel" when held in the hand.

Colored, machinable glass-ceramic articles can be made by providing batched materials within the compositional ranges cited herein and, after preparing a glass from said batched materials, ceramming the glass to form a colored, machinable glass-ceramic. The times and temperature for ceramming the composition of the invention are typically in the range of 3-12 hours and 850-1200° C.

DETAILED DESCRIPTION

Figure 1:
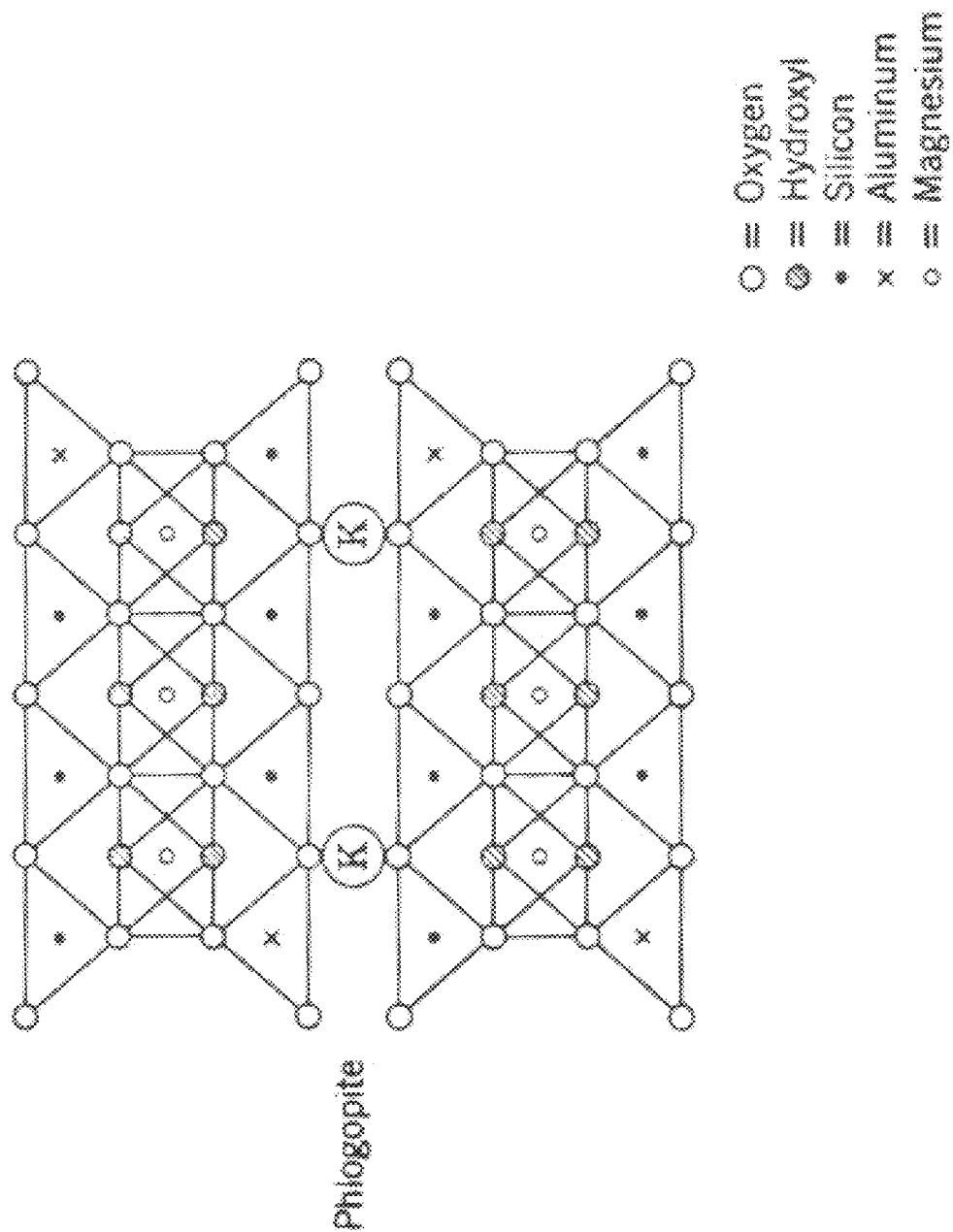
FIG. 1 is a schematic illustration of the phlogopite structure $KMg_3(Si_3Al)O_{10}(OH,F)_2$ showing tetrahedral and octahedral layers with $K^+$ ions between the layers.

When a composition herein is given a range of 0-X wt %, this refers to the amount of material added to a batch and excludes contaminant levels of the same material. As those skilled in the art know, metals, for example iron, are frequently found at contaminant levels in batched glass and glass-ceramic products. Consequently, in those cases where a batch material is described as being in a range of O—X wt %, it is to be understood that this refers to "added material" and that in those cases where the "added material is 0 wt %" any such that may be present in the final glass-ceramic material is contaminant material.

As has been indicated above, a number of machinable glass-ceramic compositions have been described in the prior art, including those based on trisilicic mica crystal structures (U.S. Pat. No. 3,689,293), tetrasilicic mica structures (U.S. Pat. Nos. 3,732,087 and 3,839,055), and non-alkali-containing mica structures (U.S. Pat. No. 3,756,838). Table 1 gives a summary of the compositions described in this prior art.

TABLE 1

General types of mica structures in glass-ceramics (prior art)

| Wt % | Trisilicic mica GCs | Tetrasilicic GC | Non-alkali mica GC |
|---|---|---|---|
| $SiO_2$ | 25-60 | 45-75 | 30-65 |
| $Al_2O_3$ | 5-25 | 0-5 | 5-26 |
| $B_2O_3$ | 5-15 | 0 | |
| MgO | 5-25 | 8-30 | 10-35 |
| F | 4-20 | 3-15 | 4-12 |
| $K_2O$ | See below | 2-20 | |
| $Li_2O$ | 0-7 | 0-5 | |
| $R_2O$ | 2-20 | See below | |
| $ZrO_2$ | | 0-7 | |
| SrO | | | 5-25 |
| BaO | | | 0-25 |
| Where | The sum of $Al_2O_3 + B_2O_3 = 15\text{-}35\%$ The sum of $MgO + Li_2O = 6\text{-}25\%$ $R_2O = $ alkali oxides: $K_2O = 0\text{-}15\%$ $Na_2O = 0\text{-}15\%$ $Rb_2O = 0\text{-}15\%$ $Cs_2O = 0\text{-}20\%$ | $Na_2O = 0\text{-}5$ | |

The glass-ceramics can be colored using selected metal colorants, generally in the form of their oxides or sulfides. They are added as dopants in an amount of greater than zero (>0) up to ~3 wt %. Examples of the resulting colors include:

| | |
|---|---|
| No additives: | White |
| $Co_3O_4$, CoO: | Blue-violet |
| NiO: | Grey-brown |
| $Cr_2O_3$: | Green-brown |
| CuO: | Blue-green |
| FeO, $Fe_2O_3$: | Green-brown |
| NiS: | Grey |
| CdS: | Yellow. |

These types of colors are similar to those described in prior art U.S. Pat. Nos. 3,689,293 and 5,070,044.

In the course of investigating colored machinable glass-ceramics and preparing samples within the compositional range recited above, we have discovered a new area of colored, iron-rich machinable glass-ceramics based on iron-rich micas which is in some instances mixed with iron oxides. No prior art specific to the high levels of iron in a machinable glass-ceramic has been found.

Generally, the colored glass-ceramics of the invention have a composition which comprises, in weight %:

| | |
|---|---|
| $SiO_2$ | 25-75% |
| $Al_2O_3$ | 0-26% |
| $B_2O_3$ | 0-15% |
| MgO | 5-35% |
| F | 3-20% |
| $K_2O$ | 0-20% |
| $TiO_2$ | 0-5% |
| $Na_2O$ | 0-15% |
| $Li_2O$ | 0-7% |
| $ZrO_2$ | 0-7% |
| SrO | 0-25% |
| BaO | 0-25% | and colorant in an amount of >0 wt % colorant≦3 wt %, except that when the colorant is iron the iron is present in an amount of >0 wt % colorant≦20 wt %. The colorants are added in the form of metal oxides and/or sulfides. Examples, without limitation, of such colorants are $CO_3O_4$, CoO, NiO, $Cr_2O_3$, CuO, FeO, $Fe_2O_3$, NiS, and CdS. Other metal colorants known in the art of glass making can also be used to contain the desired colors. Using the above compositional range one can prepare glass-ceramics in which the mica structures are trisilicic, tetrasilicic or non-alkali. For example, when all the above, excluding colorant, are present one can prepare a glass-ceramic in which the mica phase is trisilicic. By deleting the boron and the alumina, or reducing the alumina to less than 5 wt %, one can prepare a glass-ceramic in which the mica phase is tetrasilicic. By deleting the alkali (Na and K, Li being considered an alkali in these compositions), one can prepare a glass-ceramic in which the mica phase is non-alkali. Further, in the glass-ceramics of the invention the mica phase is selected from the group consisting of trisilicic, tetrasilicic or non-alkali-containing mica phases, and intermediate mica phases, for example, those between the trisilicic and tetrasilicic phases.

In one embodiment of the invention the colored, iron-rich machinable glass-ceramics have a composition which comprises, in weight %:

| | |
|---|---|
| $SiO_2$ | 40-65% |
| $Al_2O_3$ | 10-20% |
| $B_2O_3$ | 3-10% |
| MgO | 10-25% |
| F | 4-9% |
| $K_2O$ | 1-15% |
| FeO + $Fe_2O_3$ | 2-20% |
| $TiO_2$ | 0-5% |
| $Na_2O$ | 0-5% |
| $Li_2O$ | 0-5% |

These glass-ceramics contain an iron-rich, trisilicic mica phase and may further contain an iron oxide phase. In some embodiments of the invention the preferred iron level is the range of 7-20 wt % to achieve the desired black color.

Examples of colored machinable glass-ceramics, including the iron-mica-based glass-ceramics, are given in Tables 2 and 3. The oxides and sulfides preceded by "x" are added in excess of 100% of the nominal value shown. Table 2 shows that many different glass-ceramic colors can be attained by proper selection of the metal oxide or sulfide used in forming the glass batch that is ultimately cerammed to form the glass-ceramic. It is also important to note that in many instances the color of the batched glass and the final glass-ceramic is different. For example, for Table 2 samples TV, TW and VL, the glass composition is black, but the final glass-ceramic color is blue-violet, beige and brown, respectively. Consequently, some experimentation, which is within the ability of one skilled in the art, may be necessary to insure that the desired glass-ceramic color is attained. In Table 2, composition VL contains an iron-rich tetrasilic mica phase. Table 3 lists two black, glass-ceramics having an iron-rich trisilicic mica phase.

TABLE 2

Colored machinable glass-ceramics

|  | TU | TV | TW | TY | TZ | UA |
|---|---|---|---|---|---|---|
| Wt % (batched) | | | | | | |
| $SiO_2$ | 61.2 | 61.2 | 61.2 | 61.2 | 61.2 | 61.2 |
| $B_2O_3$ | — | — | — | — | — | — |
| $Al_2O_3$ | — | — | — | — | — | — |
| MgO | 22.8 | 22.8 | 22.8 | 22.8 | 22.8 | 21.6 |
| F | 6.5 | 6.5 | 6.5 | 6.5 | 6.5 | 6.5 |
| $K_2O$ | 10.7 | 10.7 | 10.7 | 10.7 | 10.7 | 10.7 |
| $TiO_2$ | — | — | — | — | — | — |
| $ZrO_2$ | 1.5 | 1.5 | 1.5 | 1.5 | 1.5 | 1.5 |
| Colorants (in batch) | | | | | | |
| $Fe_2O_3$ | — | — | — | — | — | — |
| x $Co_3O_4$ | — | 1.0 | — | — | — | — |
| x NiO | — | — | 1.0 | — | — | — |
| x $Cr_2O_3$ | — | — | — | 0.25 | — | — |
| x CuO | — | — | — | — | 1.0 | — |
| x FeO | — | — | — | — | — | 2.7 |
| x CdS | 1.5 | — | — | — | — | — |
| x ZnS | — | — | — | — | — | — |
| x $V_2O_5$ | — | — | — | — | — | — |
| Glass Color | Yellow | Black | Black | Green | Turquoise | Green |
| Heat treatment | 925° C. 4 hr | 1075° C. 6 hr | 1075° C. 6 hr | 1075° C. 6 hr | 1075° C. 6 hr | 1075° C. 6 hr |
| Glass-ceramic Color | Yellow | Blue-violet | Beige | Pale green-brown | Pale green | Pale blue-green |

|  | US | UQ | UW | UX | UY | VD | VL |
|---|---|---|---|---|---|---|---|
| Wt % (batched) | | | | | | | |
| $SiO_2$ | 59.0 | 61.0 | 46.8 | 46.8 | 46.8 | 62.3 | 57.1 |
| $B_2O_3$ | — | — | 8.1 | 8.1 | 8.1 | — | — |
| $Al_2O_3$ | — | — | 16.9 | 16.9 | 16.9 | — | — |
| MgO | 22.5 | 22.5 | 14.4 | 14.4 | 14.4 | 22.9 | 18.5 |
| F | 6.1 | 6.1 | 7.3 | 7.3 | 7.3 | 6.2 | 5.9 |
| $K_2O$ | 13.0 | 11.0 | 9.6 | 9.6 | 9.6 | 11.2 | 10.4 |
| $TiO_2$ | — | — | — | — | — | — | — |
| $ZrO_2$ | 2.0 | 2.0 | — | — | — | 2.0 | 2.4 |
| Colorants (in batch) | | | | | | | |
| $Fe_2O_3$ | — | — | — | — | — | — | 8.2 |
| x $Co_3O_4$ | 1.0 | — | — | 1.0 | 0 | 0.5 | — |
| x NiO | — | — | 1.0 | — | — | 1.0 | — |
| x $Cr_2O_3$ | — | — | — | — | — | — | — |
| x CuO | — | — | — | — | 1.0 | — | — |
| x FeO | — | — | — | — | — | — | — |
| x CdS | — | — | — | — | — | — | — |
| x ZnS | — | — | 0.2 | 0.2 | — | 0.2 | — |
| x $V_2O_5$ | — | 1.0 | — | — | — | — | — |
| Glass | Black | Green | Brown opal | Black | Blue-green opal | Black | Black |
| Heat treatment | 1100° C. 4 hr | 1150° C. 4 hr | 1060° C. 4 hr | 1060° C. 4 hr | 1060° C. 4 hr | 1100° C. 4 hr | 1075° C. 4 hr |
| Glass-ceramic Color | Violet | Buff | Grey-brown | Lavender | Pale green | Grey-blue | Brown |

TABLE 3

High-iron, black, machinable glass-ceramics

| Wt % (batched) | VF | VH |
|---|---|---|
| SiO$_2$ | 42.4 | 41.2 |
| B$_2$O$_3$ | 5.0 | 8.0 |
| Al$_2$O$_3$ | 14.1 | 16.1 |
| MgO | 17.0 | 18.0 |
| F | 7.4 | 5.7 |
| K$_2$O | 3.0 | 2.3 |
| TiO$_2$ | 1.0 | 1.0 |
| ZrO$_2$ | — | — |
| Colorants (in batch) | | |
| Fe$_2$O$_3$ | 13.1 | 7.0 |
| xFeO | — | — |
| xZnS | 0.2 | — |
| xV$_2$O$_5$ | — | — |
| Glass | Black | Black |
| Heat treatment | 1075° C. 4 hr | 1075° C. 4 hr |
| Glass-ceramic Color | Black | Black |

Many natural micas and other phyllosilicates contain some iron in the octahedral site, the most common mineral being biotite which has the formula K(Fe$^{2+}$,Mg)$_3$[(Si$_3$Al)O$_{10}$](OH,F)$_2$. This mineral forms a complete solid solution with phlogopite, K(Mg)$_3$[(Si$_3$Al)O$_{10}$](OH,F)$_2$, the predominant crystal phase in trisilicic mica glass-ceramics, for example, such as MACOR® (Corning Incorporated, Corning, N.Y.). Other mica-containing glass-ceramics may have different predominant crystalline phases or contain additional microcrystals. For example, DICOR (Corning Incorporated/Dentsply) is based on tetrasilicic mica, contains added ceria and is used for dental restorations; Vitronit (Vitron Spezialwerkstoffe GmbH, Jena, Germany), a glass-ceramic having cabbage-head microstructure of mica crystals; and Photoveel (Sumikin Photon Ceramics Co., Ltd., Japan) is a fluoromica type glass-ceramic that also contain zirconia microcrystals in the glass matrix.

While less common in rocks, there are also higher iron micas such as the iron "end member" annite, K(Fe$^{2+}$)$_3$[(Si$_3$Al)O$_{10}$](OH,F)$_2$ and the mixed micas ferriannite K(Fe$^{2+}$, Mg) [(Si$_3$Fe$^{3+}$)O$_{10}$](OH,F)$_2$ and siderophyllite K(Fe$^{2+}$$_2$Al)[(Si$_2$Al$_2$)O$_{10}$](OH,F)$_2$. Solid solutions among these phases are very common. Titania is another constituent in mica; the coexistence of Ti$^{3+}$ with iron can also darken the color. The X-ray diffraction patterns of the mica phases and their solid solutions are very similar, so it is difficult to determine precisely the compositions of the mica phases in these glass-ceramics.

Figure 2:
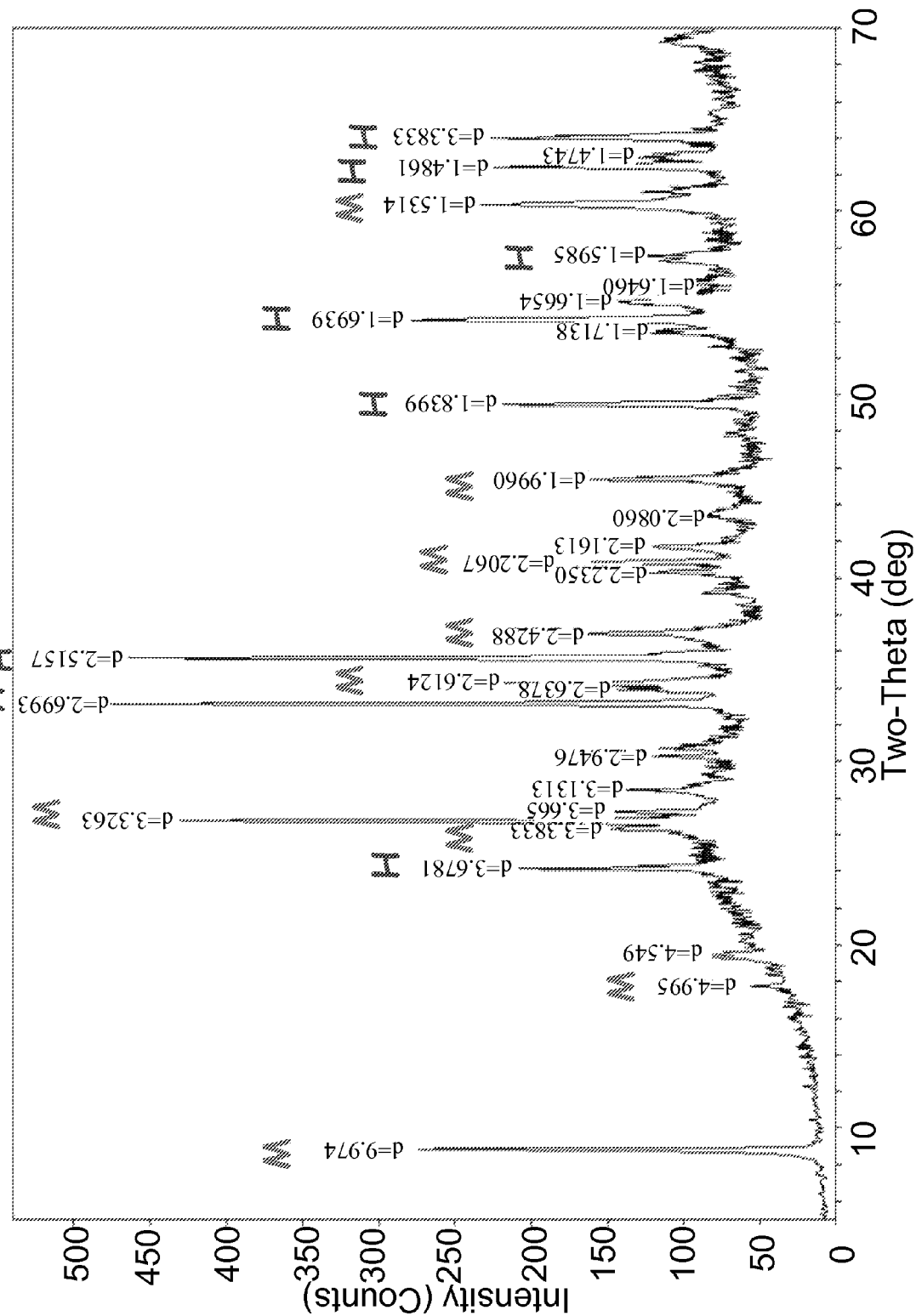
FIG. 2 is an X-ray diffraction pattern of composition VF with the mica (M) and hematite (H) peaks marked.

Depending on iron level and heat treatment, the iron-rich micas in these glass-ceramics can co-exist with iron oxide phases such as hematite (Fe$_2$O$_3$) and magnetite (Fe$^{2+}$(Fe$^{3+}$)$_2$O$_4$.) FIG. 2 shows the X-ray diffraction pattern of composition VF (composition given in Table 2). The major phases are mica (M) and hematite (H). Despite the presence of the hematite, the glass-ceramic remains highly machinable.

These high iron glass batches of Table 3 are stable and fluid and can be cast into molds and subsequently cerammed. It is likely that some of the higher silica (more viscous) compositions are compatible with pressing to near net shape, though this has not yet been carried out. For the black glasses, it is preferable to fabricate relatively thin shapes in order to more efficiently remove the heat from the glass during cooling.

Figure 3:
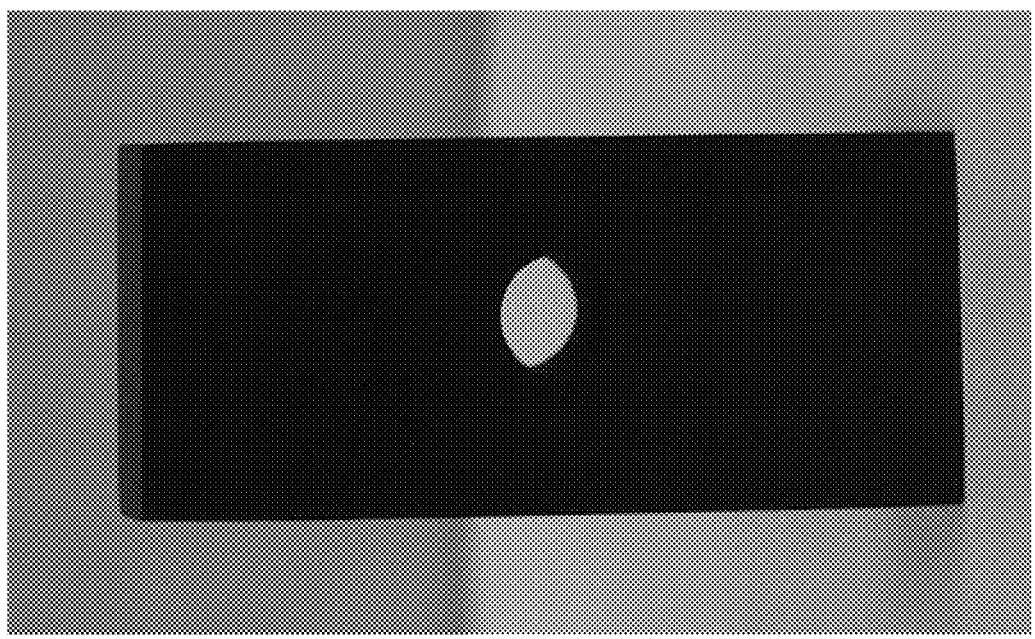
FIG. 3 is a picture of a machined black glass-ceramic body having a hole drilled through the body

FIG. 3 illustrates a machined black glass-ceramic article made from composition VF that has a hole or opening drilled in the center of the article. The size of the article is 1 cm×1 cm×3 cm.

In additional embodiments the invention is directed to an article suitable for housing the components of a portable electronic device, said article comprising colored, machinable glass-ceramic having a composition, as batched and before ceramming, of:

| | |
|---|---|
| SiO$_2$ | 25-75% |
| Al$_2$O$_3$ | 0-26% |
| B$_2$O$_3$ | 0-15% |
| MgO | 5-35% |
| F | 3-20% |
| K$_2$O | 0-20% |
| TiO$_2$ | 0-5% |
| Na$_2$O | 0-15% |
| Li$_2$O | 0-7% |
| ZrO$_2$ | 0-7% |
| SrO | 0-25% |
| BaO | 0-25% | and colorant in an amount of 0 wt %<colorant≦3 wt %, except that when the colorant is iron the colorant is present in an amount of 0 wt %<colorant≦20 wt %;

wherein said glass-ceramic article surrounds and protects the internal components of the electronic device and said article has one or a plurality of openings for enabling comunication between the user and the internal components of the electronic device, allow the device to display information for the user's viewing and allow the device to wirelessly communicate with a communications network.

An article suitable for housing the components of a portable electronic device, said article comprising black-colored, machinable glass-ceramic having a composition, as batched and before ceramming, of:

| | |
|---|---|
| SiO$_2$ | 40-65% |
| Al$_2$O$_3$ | 10-20% |
| B$_2$O$_3$ | 3-10% |
| MgO | 10-25% |
| F | 4-9% |
| K$_2$O | 1-15% |
| FeO + Fe$_2$O$_3$ | 2-20% |
| TiO$_2$ | 0-5% |
| Na$_2$O | 0-5% |
| Li$_2$O | 0-5%. | wherein said glass-ceramic article surrounds and protects the internal components of the electronic device and said article has one or a plurality of openings for enabling communication between the user and the internal components of the electronic device, allow the device to display information for the user's viewing and allow the device to wirelessly communicate with a communications network.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:
1. A composition suitable for ceramming to make a colored, machinable glass-ceramic article, said composition, as batched, comprising in weight percent:

(i) a colorant in an amount of 0 wt %<colorant≦3 wt %, except that when the colorant is iron the colorant is present in an amount of 0 wt %<colorant≦20 wt % and
(ii) a precursor glass composition selected from the group of:
  a. compositions containing a trisilicic mica phase after ceramming that consists essentially of 25-60% $SiO_2$, 5-25% $Al_2O_3$, 5-15% $B_2O_3$, 5-25% MgO, 4-20% F, 0-7% $Li_2O$, 0-15% $K_2O$, 0-15% $Na_2O$, 0-15% $Rb_2O$, 0-20% $Cs_2O$, 2-20% total of $K_2O+Na_2O+Rb_2O+Cs_2O$, 15-35% total of $Al_2O_3+B_2O_3$ and 6-25% total of $MgO+Li_2O$; and
  b. compositions containing a non-alkali-oxide-containing mica phase after ceramming that consists essentially of 30-65% $SiO_2$, 5-26% $Al_2O_3$, 10-35% MgO, 4-12% F, 5-25% SrO and 0-25% BaO.

2. The composition according to claim 1, wherein said colorants are added to the batch as transition metal oxides and/or sulfides.

3. The composition according to claim 1, wherein after ceramming iron is present in the form of iron-rich mica crystals.

4. The composition according to claim 1, wherein after ceramming iron is present in the form of iron-rich mica crystals admixed with iron oxide.

5. A composition suitable for making a black colored, machinable glass-ceramic article, said composition, as batched, comprising in weight percent:

| | |
|---|---|
| $SiO_2$ | 40-65% |
| $Al_2O_3$ | 10-20% |
| $B_2O_3$ | 3-10% |
| MgO | 10-25% |
| F | 4-9% |
| $K_2O$ | 1-15% |
| $FeO + Fe_2O_3$ | 2-20% |
| $TiO_2$ | 0-5% |
| $Na_2O$ | 0-5% |
| $Li_2O$ | 0-5%. |

6. The composition according to claim 5, wherein after ceramming said iron is present in the form of iron-rich mica crystals.

7. The composition according to claim 5, wherein after ceramming said iron is present in the form of iron-rich mica crystals admixed with iron oxide.

* * * * *